United States Patent
Carttar et al.

(10) Patent No.: US 8,620,694 B2
(45) Date of Patent: *Dec. 31, 2013

(54) SYSTEM AND METHOD FOR PRODUCING A FLEXIBLE GEOGRAPHICAL GRID

(75) Inventors: David Carttar, Lawrence, KS (US); Mohan Sharma, Fremont, CA (US); Surya Gunturi, Fremont, CA (US); Robert Muir-Wood, Oxford (GB); Pane Stojanovski, Cupertino, CA (US)

(73) Assignee: Risk Management Solutions, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,162

(22) Filed: Jul. 23, 2012

(65) Prior Publication Data

US 2012/0290334 A1 Nov. 15, 2012

Related U.S. Application Data

(63) Continuation of application No. 10/911,685, filed on Aug. 5, 2004, now Pat. No. 8,229,766.

(60) Provisional application No. 60/592,216, filed on Jul. 30, 2004.

(51) Int. Cl.
*G06Q 40/00* (2012.01)

(52) U.S. Cl.
USPC .............. 705/4; 705/1.1; 701/455; 701/520

(58) Field of Classification Search
USPC ..................................... 705/35–45
See application file for complete search history.

(56) References Cited

U.S. PATENT DOCUMENTS

| | | | |
|---|---|---|---|
| 5,839,113 A | | 11/1998 | Federau et al. |
| 5,848,373 A | * | 12/1998 | DeLorme et al. ............. 701/455 |
| 5,855,005 A | | 12/1998 | Schuler et al. |
| 6,077,869 A | | 6/2000 | Sui et al. |
| 6,223,122 B1 | * | 4/2001 | Hancock et al. ............. 701/520 |
| 6,405,134 B1 | | 6/2002 | Smith et al. |

(Continued)

FOREIGN PATENT DOCUMENTS

| | | |
|---|---|---|
| JP | 06-043804 | 2/1994 |
| JP | 09-305108 | 11/1997 |

(Continued)

OTHER PUBLICATIONS

Algermissen, S. T., & Steinbrugge, K. V. (1984). Seismic hazard and risk assessment: Some case studies. Geneva Papers on Risk & Insurance, 9(1), 8-26. doi:http://dx.doi.org/10.1057/gpp.1984.2.*

(Continued)

*Primary Examiner* — Alexander Kalinowski
*Assistant Examiner* — Abhishek Vyas
(74) *Attorney, Agent, or Firm* — Jackson & Co., LLP

(57) ABSTRACT

A variable resolution grid provides a mechanism for focusing specific concentrations of risk exposure on a geographical grid to determine projected loss caused by a particular catastrophe. The geographic grid provides a stable base map by using latitudes and longitudes to define the grid points and cells. Each cell is assigned a geographic identifier or geocode that identifies the location of the cell and its associated resolution. The resolution of the grid may be varied depending in part, on the resolution of any available of hazard data.

18 Claims, 3 Drawing Sheets

(56) References Cited

U.S. PATENT DOCUMENTS

| | | |
|---|---|---|
| 6,513,019 B2 | 1/2003 | Lewis |
| 6,556,991 B1 | 4/2003 | Borkovsky |
| 6,678,615 B2 | 1/2004 | Howard et al. |
| 6,686,917 B2 | 2/2004 | Tarr |
| 6,741,993 B1 | 5/2004 | Zitaner et al. |
| 7,009,619 B2 | 3/2006 | Akitsune et al. |
| 7,107,285 B2 | 9/2006 | Von Kaenel et al. |
| 7,359,799 B2 | 4/2008 | Bresch et al. |
| 7,949,548 B2 | 5/2011 | Mathai et al. |
| 2001/0027437 A1 | 10/2001 | Turbeville et al. |
| 2002/0042770 A1 | 4/2002 | Slyke et al. |
| 2002/0080138 A1 | 6/2002 | Tarr |
| 2002/0138197 A1 | 9/2002 | Schramke et al. |
| 2002/0173980 A1 | 11/2002 | Daggett et al. |
| 2002/0188556 A1 | 12/2002 | Colica et al. |
| 2003/0009287 A1 | 1/2003 | Howard et al. |
| 2003/0120568 A1 | 6/2003 | Chacko et al. |
| 2003/0167125 A1 | 9/2003 | Seeman et al. |
| 2003/0195776 A1 | 10/2003 | Moore et al. |
| 2004/0064346 A1 | 4/2004 | Schneider et al. |
| 2004/0117358 A1 | 6/2004 | Von Kaenel et al. |
| 2004/0193494 A1 | 9/2004 | Zitaner et al. |
| 2004/0210594 A1 | 10/2004 | Gosselin |
| 2005/0007450 A1 | 1/2005 | Hill et al. |
| 2005/0131828 A1 | 6/2005 | Gearhart |
| 2005/0144114 A1 | 6/2005 | Ruggieri et al. |
| 2005/0159882 A1* | 7/2005 | Howard et al. ............ 701/200 |
| 2005/0187881 A1 | 8/2005 | McGiffin et al. |
| 2005/0192963 A1 | 9/2005 | Tschiegg et al. |
| 2005/0203825 A1 | 9/2005 | Angle et al. |
| 2005/0246222 A1 | 11/2005 | Bailey |
| 2007/0096945 A1 | 5/2007 | Rasmussen et al. |
| 2007/0203759 A1 | 8/2007 | Mathai et al. |
| 2007/0214023 A1 | 9/2007 | Mathai et al. |

FOREIGN PATENT DOCUMENTS

| | | |
|---|---|---|
| JP | 11-211839 | 8/1999 |
| JP | 11-314865 | 11/1999 |
| JP | 2001/005834 | 1/2001 |
| JP | 2003/204568 | 7/2003 |
| JP | 2003/271052 | 9/2003 |
| JP | 2004/020219 | 1/2004 |
| JP | 2004/062248 | 2/2004 |
| WO | WO-02/19091 | 3/2002 |
| WO | WO-2007/098268 | 8/2007 |
| WO | WO-2007/103402 | 9/2007 |

OTHER PUBLICATIONS

Ke, Y. (2003). Integrating natural hazard mitigation into land use management: The case of seismic risk. (Order No. 3089507, University of Louisville). ProQuest Dissertations and Theses, , 201-201 p. Retrieved from http://search.proquest.com/docview/305323728?accountid=14753. (305323728).*

Vulnerability of port and harbor communities to earthquake and tsunami hazards in the Pacific Northwest Wood, N. J. (2003). Vulnerability of port and harbor communities to earthquake and tsunami hazards in the pacific northwest. (3069941, Oregon State University). ProQuest Dissertations and Theses, , 262-262 p. Retrieved from http://search.proquest.*

GIS component based 3D landslide hazard assessment system: 3DSlopeGIS Xie, M., Zhou, G., & Esaki, T. (2003). GIS component based 3D landslide hazard assessment system: 3DSlopeGIS. Chinese Geographical Science, 13(1), 66-72. doi:http://dx.doi.org/10.1007/s11769-003-0087-3.*

Ha, "CAT Modeling, Forecasting Tools More Sophisticated", *National Underwriter Property & Casualty-Risk & Benefit Management*, Feb. 23, 2004, pp. 17.

Leclerc, Y., "The design of FM: Data integration software for the zoning of natural hazards in developing countries", *M.E.D. Dissertation, University of Calgary*, Publication No. AAT MM93932, 1994.

Liao, Q., "GIS-based landslide hazard zonation mapping using statistical approaches", *Ph.D. Dissertation, University of Arkansas*, Publication No. AAT 3149239, 2004.

Nath, K. S., et al., "Seismic Hazard Mapping and Microzonation in the Sikkim Himalaya through GIS Integration of Site Effects and Strong Ground Motion Attributes", *Natural Hazards*, vol. 31, 2004, pp. 319-342.

Steed, C.A., et al., "VGRID: A Generic, Dynamic HDF5 Storage Model for Georeferenced Grid Data", *Oceans 2002 MTS/IEEE Proceedings of the Past, Visions of the Future, Conference Proceedings*, vol. 2, pp. 900-907, 2002.

Takasaka, H., "Handbook of Geographic Information Technologies", *Asakura Press, K.K.*, pp. 8-13, 2002.

Japanese Patent Application No. 2007-502408, Original Language and English Translation of Office Action mailed Jun. 19, 2012.

Japanese Patent Application No. 2007-502408, Original Language and English Translation of Office Action mailed Mar. 15, 2011.

PCT Application No. PCT/GB2005/000957, International Search Report mailed Jan. 5, 2006.

U.S. Appl. No. 10/911,685, Advisory Action mailed May 19, 2010.

U.S. Appl. No. 10/911,685, Notice of Allowance mailed Jun. 12, 2012.

U.S. Appl. No. 10/911,685, Office Action mailed Apr. 28, 2009.

U.S. Appl. No. 10/911,685, Office Action mailed Feb. 23, 2010.

U.S. Appl. No. 10/911,685, Office Action mailed Jun. 24, 2011.

* cited by examiner

SYSTEM AND METHOD FOR PRODUCING A FLEXIBLE GEOGRAPHICAL GRID

CROSS-REFERENCE TO RELATED APPLICATIONS

This application is a continuation of U.S. patent application Ser. No. 10/911,685 filed Aug. 5, 2004, now U.S. Pat. No. 8,229,766, entitled "System and Method for Producing a Flexible Geographical Grid", which claims the benefit of U.S. Provisional Patent Application No. 60/592,216 filed Jul. 30, 2004, entitled "System and Method for Producing a Flexible Geographical Grid", the disclosures of each of which are incorporated herein by reference for all purposes. This application is related to U.S. patent application Ser. No. 10/797,143 filed on Mar. 11, 2004, now U.S. Pat. No. 7,707,050, entitled "Systems and Methods for Determining Concentrations of Exposure," the disclosure of which is incorporated herein by reference for all purposes.

FIELD OF THE INVENTION

The invention relates to a system and method for producing a flexible geographical grid for use by a computer-implemented system or method for analyzing one or more geographical models including exposure information to identify potential risks.

BACKGROUND OF THE INVENTION

Catastrophe modeling technology has become a vital tool for quantifying, managing, and transferring risk, particularly in the insurance industry. Any company with financial assets exposed to catastrophes or other loss can benefit from catastrophe modeling. Insurers, reinsurers, brokers, financial markets, corporations, and others have all recognized the need to employ quantitative models based on the synthesis of available scientific research to evaluate the probability of financial loss.

Using computerized models, underwriters price risk based on the evaluation of the probability of loss for a particular location and property type as well as manage portfolios of risks according to the degree to which losses correlate from one location to another as part of the same catastrophe event. These probabilistic (stochastic) catastrophe models include, but are not limited to, earthquake, fire following earthquake, tropical/cyclone (hurricanes, typhoons, and cyclones), extra-tropical cyclone (windstorm), storm-surge, river flooding, tornadoes, hailstorms, terrorism and other types of catastrophe events. These catastrophe models are built upon detailed geographical databases describing highly localized variations in hazard characteristics, as well as databases capturing property and casualty inventory, building stock, and insurance exposure information.

Modeling systems using these models allow catastrophe managers, analysts, underwriters and others in the insurance markets (and elsewhere) to capture exposure data, to analyze risk for individual accounts or portfolios, to monitor risk aggregates, and to set business strategy. Typical catastrophe modeling systems are built around a geographical model comprising exposure information for specific bounded locations or areas. These locations or areas of interest are typically defined using for example, postal code boundaries, including ZIP codes, city (or other administrative) boundaries, electoral or census ward boundaries and similar bounded geographical subdivisions.

A drawback of using these types of mechanisms (e.g., postal boundaries, cities, municipalities, building Ids, or zip codes) to define locations or areas is that they tend to change over time.

Another drawback of these types of mechanisms to define locations or areas is that they do not allow the system or user the flexibility to select different resolutions. In addition, it may be very difficult to identify a single location that characterizes the risk of the whole geographic area.

These and other drawbacks exist.

SUMMARY OF THE INVENTION

One object of the invention is to overcome the drawbacks of the conventional modeling methods and systems.

Another object of the invention is to provide a system and method for supplying risk assessment information using geographical and exposure data.

Another object of the invention is to provide a system and method for the flexible modeling of global geographic data.

Another object of the invention is to provide a system and method for optimizing the resolution used for modeling geographical and hazard data.

This invention relates to a system and method of providing a variable resolution grid (VRG). A variable resolution grid provides a way of locating and focusing specific concentrations of risk exposure on a geographical grid to determine projected loss caused by a particular catastrophe. An exposure may be defined as the potential financial liability that may be incurred by a party or parties. A catastrophe may be natural, man-made, or a combination of the two. Some examples of catastrophes may include earthquakes, fires, tornados, hurricanes, typhoons, flooding, blizzards, hailstorms, windstorms, nuclear meltdowns, terrorist acts, labor strikes, war, or other catastrophes.

The invention creates a stable base map by using latitudes and longitudes to define the grid points. This enables the same geographical base map to be used for determining projected loss for more than one catastrophe.

The invention enables the use of a wide range of resolutions determined by the number of times the latitude and longitude grid is subdivided. A higher resolution provides a more detailed geographical representation. However, a lower resolution provides for more efficient data storage.

Geocoding is the process of subdividing the latitude and longitude grid into a predetermined number of cells based on the desired number of possible resolutions. A single geographic identifier (also referred to as a GEOID) is created for every geocoded point with a precision of up to 0.0001 degrees (approximately 10 meters). In an exemplary embodiment, eight lower resolutions will also be considered: 0.0005, 0.001, 0.005, 0.01, 0.05, 0.1, 0.5, and 1.0 degree(s). These resolutions correspond to precise subdivisions of a single degree of latitude and longitude. Thus, when modeling the geographical data, an optimal resolution may be chosen from the number of different resolutions provided by the geocoding process.

According to the invention, each GEOID is represented by a number that determines where in a coordinate system the variable resolution grid cell (VRG-cell) is located. The higher resolution geographic identifiers have more digits in order to describe the variable resolution grid cell's location in relation to a greater number of cells or subdivisions.

Some embodiments of the invention generally relate to a method of assigning geographic identifiers to high or low-resolution locations during a geocoding process then matching the geographic identifiers with variable resolution exposure data during the exposure data retrieval process.

During exposure data retrieval, an exposure data retrieval engine retrieves a set of GEOIDs corresponding to the one or more exposures being analyzed, one for each variable resolution grid resolution level. These sets of VRG-cell GEOIDs are parsed, rearranged, and concatenated into a "family" of GEOIDs that correspond to different resolutions. The GEOIDs are then queried as a group against available exposure data. In some cases, the exposure data retrieval engine may find a data entry corresponding to more than one GEOID at one or more resolutions. The exposure data retrieval engine selects the highest value GEOID. Because the length of the GEOID is directly related to the resolution, the resolution of the selected GEOID represents an optimal resolution at which the exposure data can be represented.

The exposure data retrieval engine can then store all or some of the available resolution levels at which it found a match in a priority string. Thus, the system can search the stored available resolutions the next time the system searches for exposure data. If exposure data retrieval fails at any level, it falls back to the next available resolution level that has been enabled and searches again for exposure data.

In one embodiment of the invention, the retrieval process retrieves hazard data. Hazard data includes peril-specific tables of hazard values for each variable resolution grid cell's GEOID. Perils can include man made and natural catastrophes, as well as combinations thereof. The hazard values are weighted averages of hazards distributed across the entire area of the corresponding cell. Each peril specific table may have hazard data entries at different variable resolution grids.

During hazard retrieval, a hazard retrieval engine creates a set of VRG-cell GEOIDs, one for each VRG resolution level. These sets of VRG-cell GEOIDs are parsed, rearranged, and concatenated into a "family" of GEOIDs that represent different resolutions. The GEOIDs are then queried as a group against available hazard data. In some cases, the hazard engine will find a hazard data entry corresponding to more than one VRG-cell GEOID. The hazard engine selects the highest value GEOID. Because the length of the GEOID is directly related to the resolution, the resolution of the selected VRG-cell ID represents the optimal resolution.

The hazard retrieval engine then stores all the available resolution levels at which it found a match in a priority string. This enables the stored available resolutions to be searched first for hazard data. If hazard retrieval fails at any level, it falls back to the next available resolution level that has been enabled in the priority string and searches again for hazard data.

It should be recognized that the variable resolution grid can be used with other types of geographical data that correspond to different locations on a location grid.

Other objects, advantages, and embodiments of the invention are set forth in part in the description that follows and in part will be apparent to one of ordinary skill in the art.

DETAILED DESCRIPTION OF THE INVENTION

The invention relates generally to a system and method of providing a Variable Resolution Grid (VRG). A VRG provides a way of locating specific concentrations of exposures on a geographical grid to determine a projected loss caused by a particular catastrophe. An exposure may be defined as the potential financial liability that may be incurred by a party or parties. A catastrophe can be natural, man-made or a combination of the two. Some examples of catastrophes may include earthquakes, fires, tornados, hurricanes, typhoons, flooding, blizzards, hailstorms, windstorms, nuclear meltdowns, terrorist acts, labor strikes, war, or other catastrophes.

The invention creates a stable base map using latitudes and longitudes to define the grid points. This enables the same geographical base map to be used for determining projected loss for more than one catastrophe.

The invention enables the use of a wide range of resolutions determined by the number of times the latitude and longitude grid is subdivided. A higher resolution provides a more detailed geographical representation. However, a lower resolution provides for more efficient data storage.

This invention relates to a system and method of providing a Variable Resolution Grid (VRG). A VRG provides a way of focusing specific concentrations of exposures on a geographical grid to determine projected loss caused by a particular catastrophe. An exposure may be defined as the potential financial liability that may be incurred by a party or parties. A catastrophe may be natural, man-made, or some combination of the two. Some examples of catastrophes may include, but are not limited to, earthquakes, fires, tornados, hurricanes, typhoons, flooding, blizzards, hailstorms, windstorms, nuclear meltdowns, terrorist acts, labor strikes, war, or other catastrophes.

Geocoding is the process of subdividing a latitude and longitude grid into a predetermined number of cells based on the desired number of possible resolutions. A single geographic identifier (also referred to as a GEOID) is created for every geocoded point with a precision of up to 0.0001 degrees (approximately 10 meters). In an exemplary embodiment, eight lower resolutions may also be utilized, namely 0.0005, 0.001, 0.005, 0.01, 0.05, 0.1, 0.5, and 1.0 degree(s). The lower resolutions include four "standard" levels (0.001, 0.01, 0.1, and 1.0 degree) and four "intermediate" levels differing by the next resolution by 50% (0.0005, 0.005, 0.05, 0.5 degree). These resolutions correspond to precise subdivisions of a single degree of latitude and longitude. Thus, when modeling the geographical data, an optimal resolution is chosen from the number of different resolutions provided by the geocode based on the resolution of the geographic model.

Figure 1:
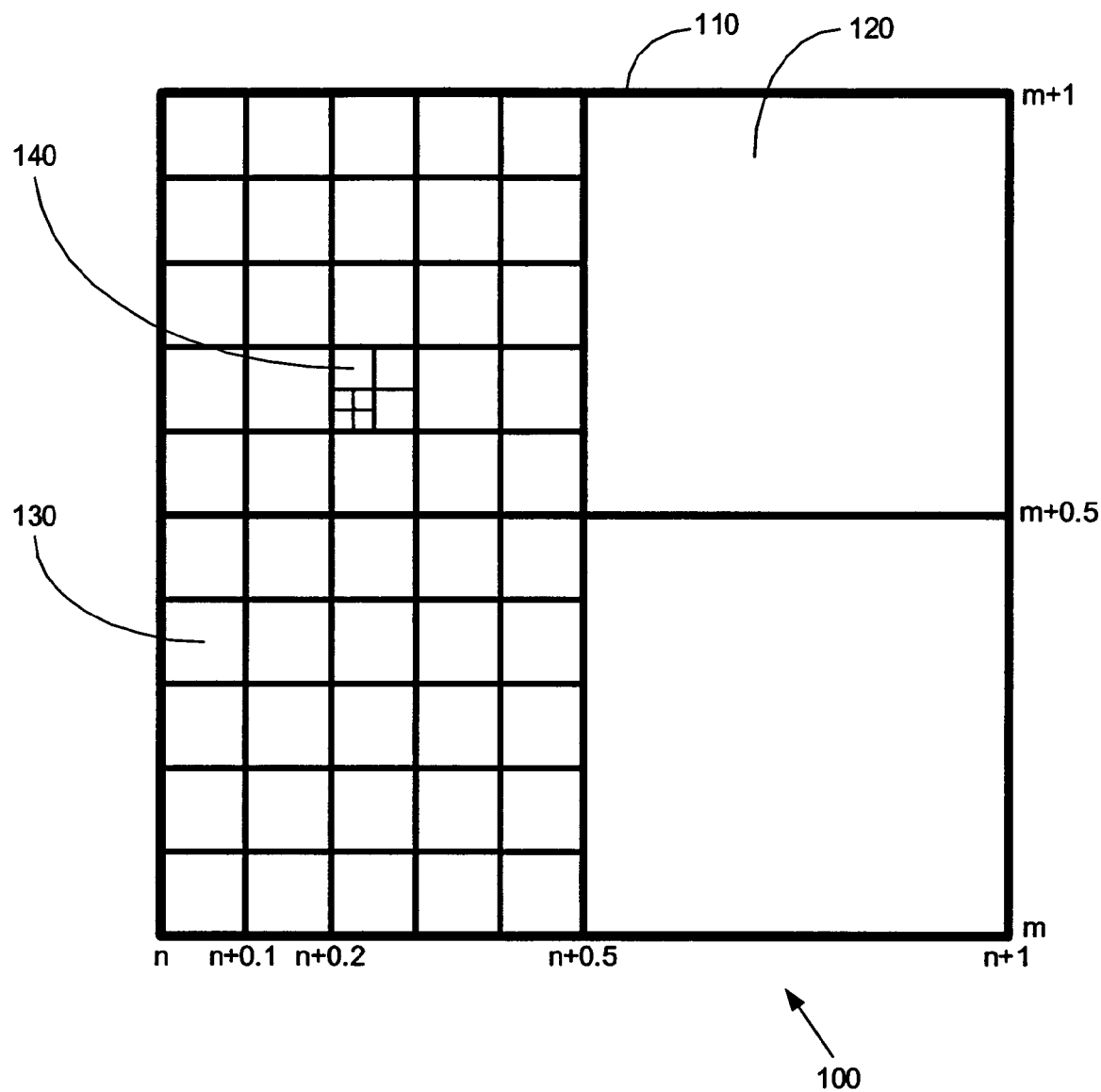
FIG. 1 illustrates various resolutions of a variable resolution grid according to an embodiment of the invention

FIG. 1 illustrates a VRG framework 100 according to one embodiment of the invention. VRG framework 100 includes cells at various resolutions including a 1 degree cell 110, a 0.5 degree cell 120, a 0.1 degree cell 130, a 0.05 degree cell 140. While not illustrated in FIG. 1, VRG FRAMEWORK 100 may include additional resolutions including 0.01, 0.005, 0.001, 0.0005, and 0.0001 as noted above.

Figure 2:
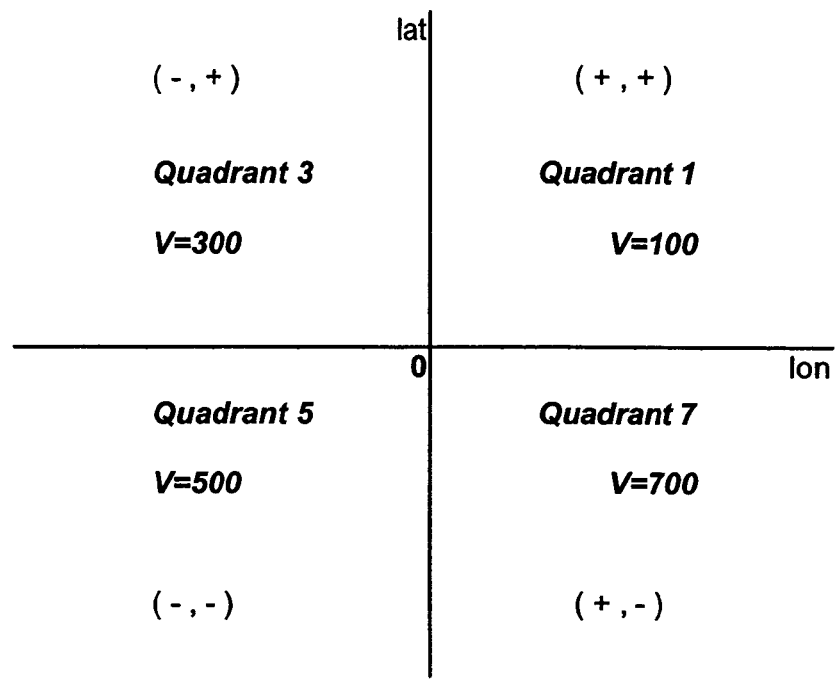
FIG. 2 illustrates a Cartesian coordinate frame describing an assignment of a quadrant prefix for a geocode.
Figure 3:
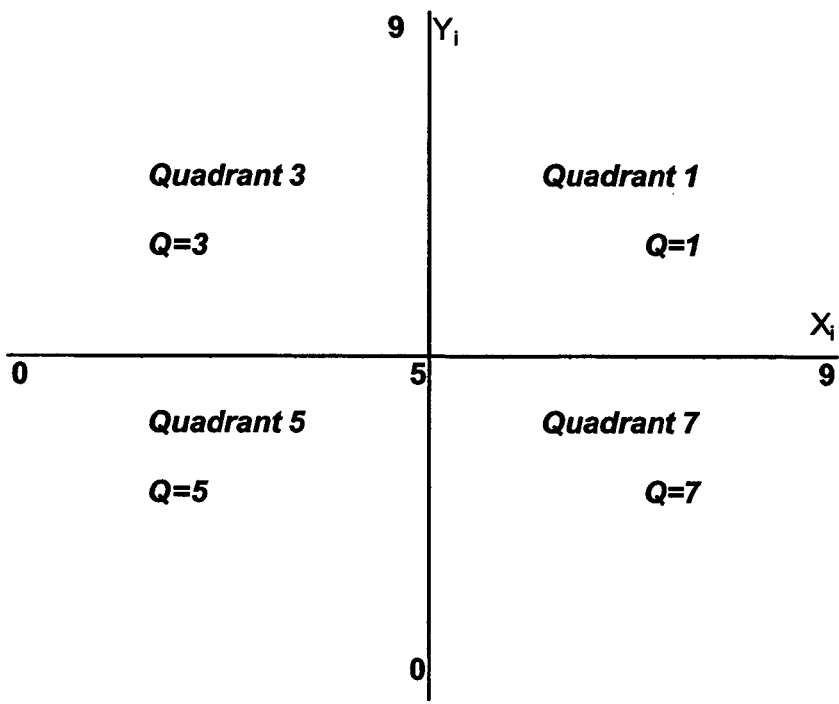
FIG. 3 illustrates a Cartesian coordinate frame describing an assignment of a sub-quadrant suffix for a geocode.

In an exemplary embodiment, a GEOID for a cell at a particular longitude and latitude pair may be represented as:
RRR YY $X_1Y_1X_2Y_2X_3Y_3$(Q)
where
XXX.$X_1X_2X_3X_4$ is the absolute value of longitude expressed to four decimal places;

YY.$Y_1Y_2Y_3Y_4$ is the absolute value of latitude expressed to four decimal places;

RRR (also referred to as a quadrant prefix) is a sum (expressed with three digits) of a value V assigned to a quadrant in which the cell is located (see FIG. 2) and the whole portion of the longitude coordinate (XXX);

V is from the set {100, 300, 500, 700} assigned to the quadrant in which the cell is located;

YY represents two digits corresponding to the whole portion of the latitude coordinate;

$X_1Y_1$ represents two digits, one corresponding to the tenths component of the longitude coordinate ($X_1$) and one corresponding to the tenths component of the latitude component ($Y_1$);

$X_2Y_2$ represents two digits, one corresponding to the hundredths component of the longitude coordinate ($X_2$) and one corresponding to the hundredths component of the latitude component ($Y_2$);

$X_3Y_3$ represents two digits, one corresponding to the thousandths component of the longitude coordinate ($X_3$) and one corresponding to the thousandths component of the latitude component ($Y_3$);

$X_4Y_4$ represents two digits, one corresponding to the ten-thousandths component of the longitude coordinate ($X_4$) and one corresponding to the ten-thousandths component of the latitude component ($Y_4$); and Q (also referred to as a sub-quadrant suffix) represents an intermediate "sub-quadrant" of the next lowest-resolution standard grid and has a value from the set {1, 3, 5, 7} assigned to that sub-quadrant (see FIG. 3).

According to various embodiments of the invention, quadrant prefix RRR is selected as a space-saving mechanism, because the first digit of the 3-digit X coordinate can only be 0 or 1 (the range of RRR is {100-880}, as the range of XXX is {0-180}). Both quadrant prefix RRR and sub-quadrant suffix Q are based on a modified division of the standard Cartesian plane, such as that illustrated in FIG. 2 and FIG. 3, respectively. As an example of the above embodiment of the invention, the GEOIDs corresponding to two coordinate pairs, representing high-resolution geocode matches in South Carolina (SC) and Hawaii (HI) are set forth in Table I.

TABLE I

| Location | Longitude (lon) | Latitude (lat) | GEOID |
|---|---|---|---|
| SC | −79.03157 | 33.57249 | 3793305371254 |
| HI | −157.75319 | 21.28602 | 4572172583610 |

In this example, each high-resolution grid cell location is assigned a grid code with up to thirteen digits during the geocoding process, regardless of the presence of supporting geographical modeling data at the particular resolution. In some embodiments of the invention, the coordinates correspond to the corner of the grid cell closest to the origin. Other embodiments may select other locations on the perimeter or interior of the grid cell as apparent. As illustrated below in Table II, these multiple resolutions may reveal themselves in the length of the corresponding codes: the higher resolution cells will have more digits (and hence a larger "value") than the lower resolution cells. Furthermore, in some embodiments of the invention, GEOID's for "standard" resolutions will have an odd number of digits, while "intermediate" GEOID's will have an even number.

TABLE II

| VRG Level ID | True Resolution (degrees) | Descriptive Resolution (approx. Y distance) | SC (−79.03157, 33.57249) | HI (−157.75319, 21.28602) |
|---|---|---|---|---|
| 9 | 0.0001 | 10 m | 3793305371254 (Assigned GEOID) | 4572172583610 (Assigned GEOID) |
| 8 | 0.0005 | 50 m | 379330537125 (54 dropped) | 457217258367 (10 dropped) |
| 7 | 0.001 | 100 m | 37933053712 | 45721725836 |
| 6 | 0.005 | 500 m | 3793305377 (12 dropped) | 4572172581 (36 dropped) |
| 5 | 0.01 | 1 km | 379330537 | 457217258 |
| 4 | 0.05 | 5 km | 37933051 (37 dropped) | 45721723 (58 dropped) |
| 3 | 0.1 | 10 km | 3793305 | 4572172 |
| 2 | 0.5 | 50 km | 379331 (05 dropped) | 457215 (72 dropped) |
| 1 | 1.0 | 100 km | 37933 | 45721 |

The principle behind the quadrant prefix RRR and the sub-quadrant suffix Q is similar, depending on the four possible combinations of longitude X and latitude Y. The quadrant prefix RRR depends on whether the longitude and latitude are positive or negative (i.e., greater than or less than zero). In some embodiments of the invention, all U.S. locations are in quadrant 3, so that the absolute value of longitude X increases from right to left. The sub-quadrant suffix Q depends on whether the dropped fractional components of longitude and latitude components $X_i$ and Y are greater than or equal to (>=) or less than (<) five. In some embodiments of the invention, sub-quadrant suffix Q is always odd, while the first digit of the quadrant prefix RRR can be even.

In some embodiments, the precision of geocoded coordinates is 10 to 20 times the most detailed available VRG resolution. This is to account for rounding errors in a host computer's microprocessor. For example, resolution level-6 (0.005 degrees) or level-7 (0.001 degrees) require at least four decimal places to reliably assign GEOIDs.

For each geocoded location, a hazard-retrieval engine creates a set of thirteen GEOID's, one for each VRG resolution level, and then searches for a match with the GEOID's in the appropriate hazard table. As discussed above, the hazard data may include a plurality of peril-specific tables. In some embodiments of the invention, if hazard data is available at more than one GEOID corresponding to one or more resolution levels, then the process will select the data corresponding to the highest-value (e.g., highest resolution) GEOID. Because the length of the GEOID is directly related to the VRG resolution, this will represent an optimal resolution for that location. Thus, the process selects the best available resolution at which the hazard data can be represented.

In some embodiments of the invention, in order to minimize the number of searches for nonexistent data, an indicator, such as a character string in the registry, may specify one or more resolution levels of the available hazard data.

As part of the hazard retrieval process, some portion of the assigned thirteen digit GEOID may be matched with the data (e.g., records, entries, etc.) in a series of hazard data tables. The hazard data tables can include a series of peril-specific data tables stored in peril specific databases. For example, a peril specific database may be given the name xxVHAZpp, where xx represents a two character country ID and pp represents a two character peril ID.

In some embodiments of the invention, each variable peril is represented by only one table including records for all relevant VRG resolutions. The typical VRG peril specific data table may include one or more hazard specific data values for each GEOID as would be apparent.

The present invention can be used in a variety of types of exposure accumulation analyses including Specific Area Analysis, Damage Footprint Analysis, "Spider" Analysis, and Building Level Analysis. Various ones of these are described in U.S. patent application Ser. No. 10/797,143, entitled "Systems and Methods for Determining Concentrations of Exposure," filed on Mar. 11, 2004, issued as U.S. Pat. No. 7,707,050 on Apr. 27, 2010, which is herein incorporated by reference. Other types of "what-if" analyses may be used.

Specific Area Analysis and Damage Footprint Analysis each enable a user to define an area of interest and run one or more algorithms on the selected area(s) to determine exposure information in a known manner. For example, the user may define the area of interest by plotting a circle using a specified radius around a specified latitude and longitude. The analysis returns the accumulation (exposure concentration) in the radius around the selected point. In Damage Footprint Analysis, the user may define the area of interest. Instead of assuming uniform loss to all locations within the circle, the level of loss rises towards the centre and can be represented as a series of concentric rings. Each ring may represent a different loss or exposure concentration. A Spider Analysis may enable a user to determine areas in a region to determine where exposure accumulation meeting certain criteria exist (e.g. damage is above a certain level). For example, the user can use 100% loss and perform an analysis that would return all the areas within a region having 100% loss.

A building level analysis may be used to analyze one or more selected buildings. These and other analyses may be used with the invention.

The output selection may be configured to write out more detail than for a traditional catastrophe analysis. For example, when a user performs an accumulation analysis on a portfolio, loss information can be output for the portfolio, for each account in the portfolio, and for each location. Such output selections permit viewing results, generating maps, and reports.

Figure 4:
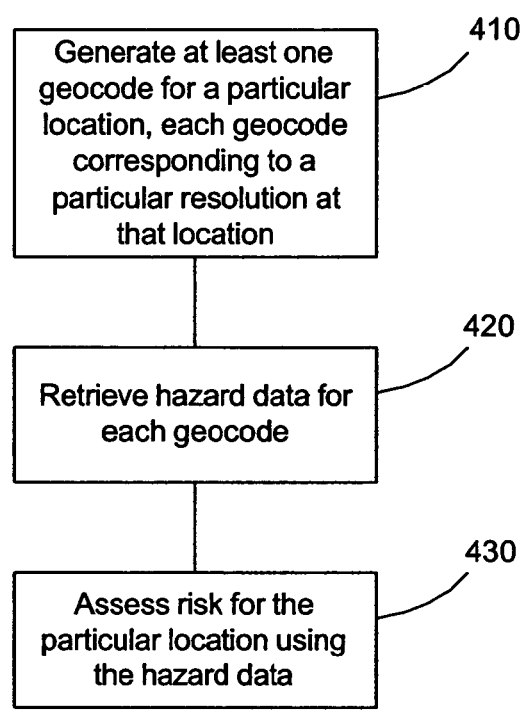
FIG. 4 illustrates an operation of a system utilizing a variable resolution grid according to various embodiments of the invention.

FIG. 4 illustrates an operation of a system that utilizes a variable resolution grid according to various embodiments of the present invention. In an operation 410, geocodes are generated at each of one or more resolutions within a particular area or region. In some embodiments, geocodes are generated for each of the possible resolutions. In some embodiments, geocodes are generated for those available for the corresponding geographic modeling data. In an operation 420, the generated geocode is used to retrieve hazard data from a hazard table for that particular geocode at a corresponding resolution. In some embodiments of the invention, hazard data is retrieved at each of the resolutions for the particular generated geocode. In other embodiments, hazard data is retrieved for the geocode corresponding to the highest resolution of the hazard data available. In some embodiments of the invention, if no hazard data is found for a particular geocode, a next lower resolution associated with that geocode is determined and that determined geocode is used to retrieve hazard data. In an operation 430, the hazard data at the particular location and resolution corresponding to the geocode is used to assess potential risk as would be apparent.

While particular embodiments of the invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

The invention claimed is:

1. A method for locating specific concentrations of risk exposure on a geographical grid, the method comprising:
   subdividing, using one or more processors, a latitude and longitude grid into a predetermined number of cells corresponding to various levels of a grid resolution, each cell having a geocoded point associated therewith;
   assigning, using the one or more processors, a geographic identifier to each geocoded point, the geographic identifier including indicia representative of a plurality of levels of grid resolution;
   obtaining, using the one or more processors, one or more geocoded points associated with corresponding cells within a particular geographical region in which to locate risk exposure;
   retrieving, using the one or more processors, hazard data for at least one cell using the geographic identifier associated with the at least one cell, wherein a resolution of the hazard data corresponds to the at least one cell, and wherein the hazard data includes a weighted average of hazard values distributed across the at least one cell;
   verifying, using the one or more processors, a presence of hazard data from a hazard table for the geographic identifier associated with the at least one cell that corresponds to a highest level of grid resolution associated with the geographic identifier;
   determining, using the one or more processors, if the hazard table includes hazard data for the at least one cell at the highest level of grid resolution, and acquiring the hazard data for the at least one cell at the highest level of grid resolution when it is determined that the hazard table includes hazard data for the at least one cell at the highest level of grid resolution;
   determining, using the one or more processors, if the hazard table does not include hazard data for the at least one cell at the highest level of grid resolution, and adjusting the geographic identifier to a lower level of grid resolution when it is determined that the hazard table does not include hazard data for the at least one cell at the highest level of grid resolution.

2. The method of claim 1, wherein each geocoded point is located at a corner of a corresponding cell.

3. The method of claim 2, wherein the corner at which each geocoded point is located is the corner closest to an origin of the latitude and longitude grid.

4. The method of claim 1, wherein each geocoded point is located on a perimeter of a corresponding cell.

5. The method of claim 1, wherein the geographic identifier assigned to the cell is related to a level of resolution to which the cell belongs.

6. The method of claim 5, wherein a length of the geographic identifier is related to the level of resolution.

7. A system, comprising:
   one or more processors; and
   a memory storing instructions which, when executed by the one or more processors, causes the one or more processors to subdivide a latitude and longitude grid into a predetermined number of cells corresponding to various levels of a grid resolution, each cell having a geocoded point associated therewith, assign a geographic identifier to each geocoded point, the geographic identifier including indicia representative of a plurality of levels of grid resolution, obtain one or more qeocoded points associated with corresponding cells within a particular geographical region in which to locate risk exposure, retrieve hazard data for at least one cell using the geographic identifier associated with the at least one cell, wherein a resolution of the hazard data corresponds to the at least one cell, and wherein the hazard data includes a weighted average of hazard values distributed across the at least one cell, verify a presence of hazard data from a hazard table for the geographic identifier associated with the at least one cell that corresponds to a highest level of grid resolution associated with the geographic identifier, determine if the hazard table includes hazard data for the at least one cell at the highest level of grid resolution, and acquiring the hazard data for the at least one cell at the highest level of grid resolution when it is determined that the hazard table includes hazard data for the at least one cell at the highest level of grid resolution, and determine if the hazard table does not include hazard data for the at least one cell at the highest level of grid resolution, and adjusting the geographic identifier to a lower level of grid resolution when it is determined that the hazard table does not include hazard data for the at least one cell at the highest level of grid resolution.

8. The system of claim 7, wherein each geocoded point is located at a corner of a corresponding cell.

9. The system of claim 8, wherein the corner at which each geocoded point is located is the corner closest to an origin of the latitude and longitude grid.

10. The system of claim 7, wherein the geographic identifier assigned to the cell is related to a level of resolution to which the cell belongs.

11. The system of claim 10, wherein a length of the geographic identifier is related to the level of resolution.

12. The system of claim 7, wherein each geocoded point is located at a perimeter of a corresponding cell.

13. The method of claim 1, wherein at least one of the plurality of levels of grid resolution is at least 0.0001 degrees.

14. The method of claim 1, wherein the weighted average is distributed across an entire area of the at least one cell.

15. The method of claim 1, wherein the weighted average of hazard values correspond to hazards that can occur in the particular geographical region corresponding to the at least one cell.

16. The system of claim 7, wherein at least one of the plurality of levels of grid resolution is at least 0.0001 degrees.

17. The system of claim 7, wherein the weighted average is distributed across an entire area of the at least one cell.

18. The system of claim 7, wherein the weighted average of hazard values correspond to hazards that can occur in the particular geographical region corresponding to the at least one cell.

* * * * *